US012614814B2

(12) United States Patent     (10) Patent No.:   US 12,614,814 B2

Yamamoto et al.       (45) Date of Patent:    Apr. 28, 2026

(54) LDH SEPARATOR AND ZINC SECONDARY BATTERY

(71) Applicant: NGK INSULATORS, LTD., Nagoya (JP)

(72) Inventors: Sho Yamamoto, Nagoya (JP); Naoko Inukai, Nagoya (JP); Shohei Yokoyama, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 619 days.

(21) Appl. No.: 18/047,692

(22) Filed: Oct. 19, 2022

(65) Prior Publication Data

US 2023/0069319 A1     Mar. 2, 2023

Related U.S. Application Data

(63) Continuation of application No. PCT/JP2021/011239, filed on Mar. 18, 2021.

(30) Foreign Application Priority Data

May 11, 2020    (JP) ................................. 2020-083518

(51) Int. Cl.
   *H01M 50/446*      (2021.01)
   *H01M 8/0236*      (2016.01)
            (Continued)

(52) U.S. Cl.
   CPC ....... *H01M 50/446* (2021.01); *H01M 8/0236* (2013.01); *H01M 8/0239* (2013.01);
            (Continued)

(58) Field of Classification Search
   CPC .................................................. H01M 50/451
   See application file for complete search history.

(56) References Cited

U.S. PATENT DOCUMENTS 9,293,791 B2    3/2016   Yamada et al.
10,290,847 B2   5/2019   Kitoh et al.
          (Continued)

FOREIGN PATENT DOCUMENTS

WO     2013/118561 A1    8/2013
WO     2016/067884 A1    5/2016
          (Continued)

OTHER PUBLICATIONS

Fan et al. "The preparation and electrochemical performance of In(OH)3-coated Zn—Al-hydrotalcite as anode material for Zn—Ni secondary cell." Electrochimica Acta 92 (2013): 365-370. (Year: 2013).*

(Continued)

*Primary Examiner* — Allison Bourke
*Assistant Examiner* — Kayla Elaine Clary
(74) *Attorney, Agent, or Firm* — BURR PATENT LAW, PLLC

(57) ABSTRACT

Provided is an LDH separator including a porous substrate and a mixture of a layered double hydroxide (LDH)-like compound and In(OH)$_3$, which fills up pores of the porous substrate. The LDH-like compound is a hydroxide and/or an oxide with a layered crystal structure containing Mg, Ti, Y, and optionally Al and/or In.

8 Claims, 3 Drawing Sheets

(51) Int. Cl.

| | |
|---|---|
| *H01M 8/0239* | (2016.01) |
| *H01M 8/0243* | (2016.01) |
| *H01M 50/417* | (2021.01) |
| *H01M 50/431* | (2021.01) |
| *H01M 50/497* | (2021.01) |

(52) U.S. Cl.
CPC ....... *H01M 8/0243* (2013.01); *H01M 50/417* (2021.01); *H01M 50/431* (2021.01); *H01M 50/497* (2021.01)

(56) References Cited

U.S. PATENT DOCUMENTS

| | | | | |
|---|---|---|---|---|
| 2004/0053132 A1* | 3/2004 | Smedley | .................. | H01M 4/42 |
| | | | | 252/182.1 |
| 2014/0315099 A1* | 10/2014 | Yamada | ................ | H01M 10/24 |
| | | | | 429/304 |
| 2015/0340680 A1* | 11/2015 | Fujisaki | .............. | H01M 50/449 |
| | | | | 429/402 |

| | | | | |
|---|---|---|---|---|
| 2017/0077476 A1* | 3/2017 | Kitoh | .................... | H01M 10/28 |
| 2017/0214019 A1 | 7/2017 | Yokoyama et al. | | |
| 2019/0126589 A1 | 5/2019 | Yamamoto et al. | | |
| 2019/0131605 A1 | 5/2019 | Yamamoto et al. | | |
| 2021/0184268 A1 | 6/2021 | Yamamoto et al. | | |

FOREIGN PATENT DOCUMENTS

| | | | | |
|---|---|---|---|---|
| WO | 2016/076047 A1 | 5/2016 | | |
| WO | 2017/221497 A1 | 12/2017 | | |
| WO | 2017/221989 A1 | 12/2017 | | |
| WO | WO-2017221526 A1 * | 12/2017 | .............. | B32B 5/18 |
| WO | 2019/131221 A1 | 7/2019 | | |
| WO | 2020/255856 A1 | 12/2020 | | |

OTHER PUBLICATIONS

International Search Report and Written Opinion (Application No. PCT/JP2021/011239) dated Jun. 15, 2021 (with English translation).

* cited by examiner

10
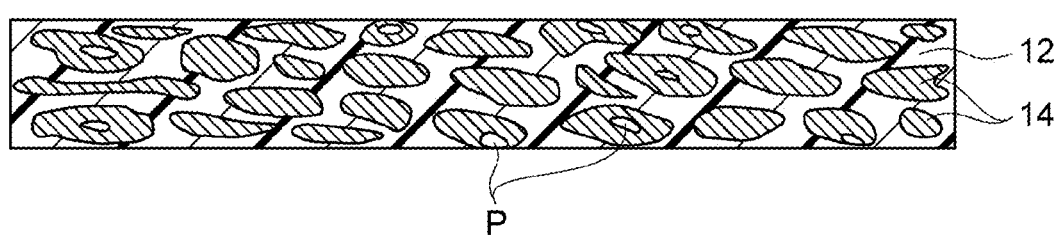
12
14
P
FIG. 1
310
312
314    334    316
He
316a
316b
316c
He
FIG. 2A
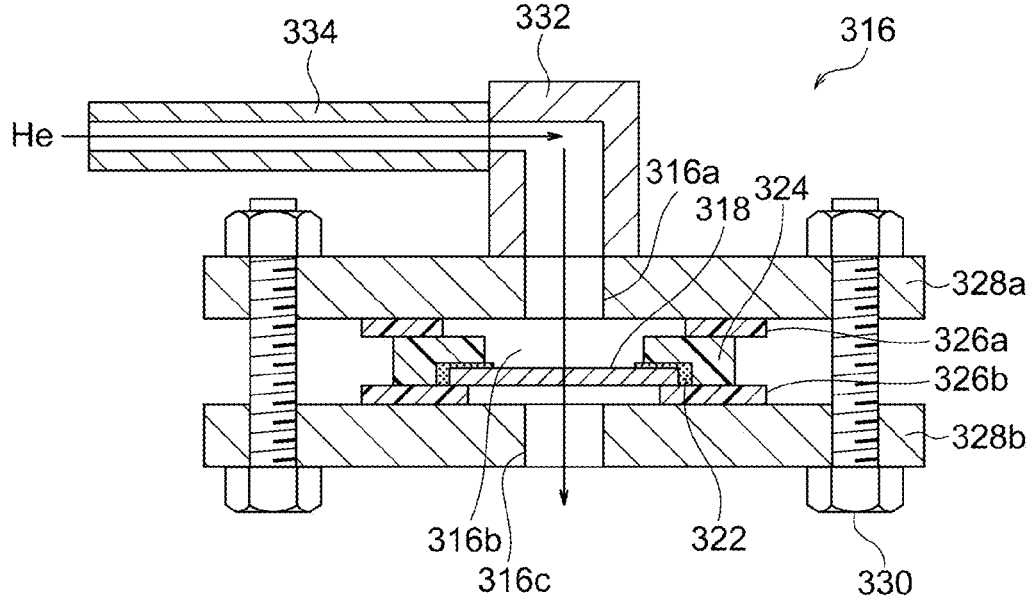
334    332    316
He
316a
318 324
328a
326a
326b
316b
316c    322    330
328b
FIG. 2B

LDH SEPARATOR AND ZINC SECONDARY BATTERY

CROSS-REFERENCE TO RELATED APPLICATIONS

This application is a continuation application of PCT/JP2021/011239 filed Mar. 18, 2021, which claims priority to Japanese Patent Application No. 2020-083518 filed May 11, 2020, the entire contents all of which are incorporated herein by reference.

BACKGROUND OF THE INVENTION

1. Field of the Invention

The present invention relates to an LDH separator and a zinc secondary battery.

2. Description of the Related Art

In zinc secondary batteries such as nickel-zinc secondary batteries and air-zinc secondary batteries, metallic zinc precipitates from a negative electrode in the form of dendrites upon charge, and penetrates into voids of a separator such as a nonwoven fabric and reaches a positive electrode, which is known to result in bringing about short-circuiting. The short circuit due to such zinc dendrites shortens a life in repeated charge/discharge conditions.

In order to deal with the above issues, batteries including layered double hydroxide (LDH) separators that prevent penetration of zinc dendrites while selectively permeating hydroxide ions, have been proposed. The layered double hydroxide (LDH) is a material having ion-exchangeable anions and $H_2O$ as interlayers between stacked hydroxide base layers. For example, Patent Literature 1 (WO2013/118561) discloses that an LDH separator is provided between a positive electrode and a negative electrode in a nickel-zinc secondary battery. Moreover, Patent Literature 2 (WO2016/076047) discloses a separator structure including an LDH separator fitted or joined to a resin outer frame, and discloses that the LDH separator has a high denseness to the degree that it has a gas impermeability and/or a water impermeability. Moreover, this literature also discloses that the LDH separator can be composited with porous substrate. Further, Patent Literature 3 (WO2016/067884) discloses various methods for forming an LDH dense membrane on a surface of a porous substrate to obtain a composite material (LDH separator). This method comprises steps of uniformly adhering a starting material that can impart a starting point for LDH crystal growth to a porous substrate and subjecting the porous substrate to hydrothermal treatment in an aqueous solution of raw materials to form an LDH dense membrane on the surface of the porous substrate. Any of LDHs disclosed in the examples of Patent Literatures 1 to 3 is a Mg, Al-LDH in which a hydroxide base layer comprises Mg and Al.

On the other hand, Patent Literature 4 (WO2017/221989) discloses an LDH-containing functional layer and a composite material (i.e., LDH separator) including an LDH which is composed of a plurality of hydroxide base layers containing Ni, Al, and Ti and OH groups, and interlayers which are interposed between the plurality of hydroxide base layers and composed of anions and $H_2O$. Moreover, Patent Literature 5 (WO2019/131221) discloses that an LDH containing Ni, Ti, and Al can further contain Y, with respect to an LDH-containing functional layer and a composite material (i.e., LDH separator).

CITATION LIST

Patent Literature

Patent Literature 1: WO2013/118561
Patent Literature 2: WO2016/076047
Patent Literature 3: WO2016/067884
Patent Literature 4: WO2017/221989
Patent Literature 5: WO2019/131221

SUMMARY OF THE INVENTION

When a zinc secondary battery such as a nickel-zinc battery is composed by using the LDH separator as described above, a short circuit, etc., due to zinc dendrites can be prevented to some extent. However, further improvement on an effect of dendrite short-circuit prevention is desired. Moreover, an electrolytic solution in an alkaline secondary battery (for example, a metal-air battery and a nickel-zinc battery) to which the LDH is applied requires high hydroxide ion conductivity, whereby a potassium hydroxide aqueous solution with a pH of about 14 and strong alkalinity is desired for use. Therefore, it is desirable for the LDH to have a high degree of alkali resistance, such that it hardly deteriorates even in such a strongly alkaline electrolytic solution.

The inventors have recently found that by using a mixture of an LDH-like compound that is a hydroxide and/or an oxide with a layered crystal structure containing at least Mg, Ti, and Y, and $In(OH)_3$, instead of using a conventional LDH, it is possible to provide an LDH separator excellent in alkali resistance and capable of more effectively inhibiting a short circuit caused by zinc dendrite.

Thus, an object of the present invention is to provide an LDH separator that is excellent in alkali resistance and can more effectively inhibit a short circuit caused by zinc dendrite.

According to an aspect of the present invention, there is provided a LDH separator comprising a porous substrate and a mixture of a layered double hydroxide (LDH)-like compound and $In(OH)_3$, which fills up pores of the porous substrate, wherein the LDH-like compound is a hydroxide and/or an oxide with a layered crystal structure, comprising Mg, Ti, Y, and optionally Al and/or In.

According to another aspect of the present invention, there is provided a zinc secondary battery comprising the LDH separator.

According to another aspect of the present invention, there is provided a solid alkaline fuel cell comprising the LDH separator.

BRIEF DESCRIPTION OF THE DRAWINGS

FIG. 1 is a schematic cross-sectional view of the conceptual LDH separator of the present invention.

FIG. 2A is a conceptual view illustrating an example of the He permeability measurement system used in Examples 1 to 3.

FIG. 2B is a schematic cross-sectional view of the sample holder used in the measurement system shown in FIG. 2A and the peripheral composition thereof.

DETAILED DESCRIPTION OF THE INVENTION

LDH Separator

Figure 3:
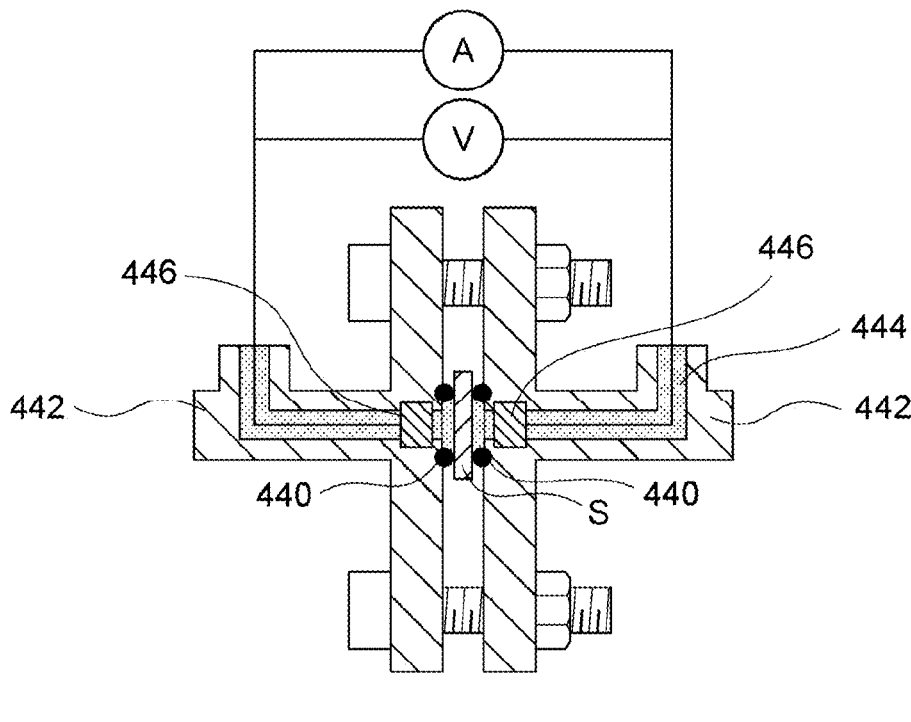
FIG. 3 is a schematic cross-sectional view of the electrochemical measurement system used in Examples 1 to 3.

As the schematic cross-sectional view is conceptually illustrated in FIG. 1, the LDH separator 10 of the present invention includes a porous substrate 12 and a mixture 14 of the layered double hydroxide (LDH)-like compound and $In(OH)_3$. As defined herein, "LDH separator" refers to a separator comprising an LDH-like compound, which selectively passes hydroxide ions by solely utilizing the hydroxide-ion conductivity of the LDH-like compound. Therefore, the LDH separator is allowed to contain a material other than the LDH-like compound (here, $In(OH)_3$) as a material to fill up the pores of the porous substrate, as long as the desired hydroxide-ion conductivity can be maintained. Incidentally, in FIG. 1, the mixture 14 region is drawn so as not to be connected between the upper surface and the lower surface of the LDH separator 10, because it is drawn two-dimensionally as a cross section, and the mixture 14 region is connected between the upper surface and the lower surface of the LDH separator 10 in a three-dimension, where depth is taken into consideration, whereby the hydroxide-ion conductivity of the LDH separator 10 is ensured. In the LDH separator 10, the mixture 14 fills up pores of the porous substrate 12. However, the pores in the porous substrate 12 do not need to be completely filled up and a small amount of residual pores P may be present. The LDH-like compound is a hydroxide and/or an oxide with a layered crystal structure that cannot be called an LDH but is analogous thereto, and contains Mg, Ti, Y, and if desired Al and/or In. In such a way, by using a mixture of the LDH-like compound that is a hydroxide and/or an oxide with a layered crystal structure, containing at least Mg, Ti, and Y, and $In(OH)_3$, instead of using the conventional LDH, it is possible to provide an LDH separator excellent in alkali resistance and capable of more effectively inhibiting a short circuit caused by zinc dendrite.

As described above, the LDH-like compound in the mixture 14 is a hydroxide and/or an oxide with a layered crystal structure containing Mg, Ti, Y, and optionally Al and/or In. Therefore, the typical LDH-like compound is a complex hydroxide and/or a complex oxide with Mg, Ti, Y, optionally Al, and optionally In. Here, In that can be contained in the LDH-like compound may be not only one intentionally added, but also one unavoidably incorporated in the LDH-like compound derived from formation of $In(OH)_3$ or the like. The elements described above may be replaced by other elements or ions to the extent that the basic properties of the LDH-like compound are not impaired, and the LDH-like compound is preferably free of Ni. By the way, an LDH that is conventionally known with respect to an LDH separator, can be represented by the basic composition of the formula: $M^{2+}_{1-x}M^{3+}_x(OH)_2A^{n-}_{x/n} \cdot mH_2O$ wherein $M^{2+}$ is a divalent cation, $M^{3+}$ is a trivalent cation, $A^{n-}$ is an n-valent anion, n is an integer of 1 or greater, x is 0.1 to 0.4, and m is 0 or greater. In contrast, the atomic ratio in the LDH-like compound generally deviates from that of the above formula of LDH. Therefore, the LDH-like compound in the present invention can be generally said to have a composition ratio (atomic ratio) different from that of conventional LDH.

The mixture 14 contains not only the LDH-like compound but also $In(OH)_3$ (typically composed of the LDH-like compound and $In(OH)_3$). $In(OH)_3$ contained effectively improves alkali resistance and dendrite resistance in the LDH separator 10. The content ratio of $In(OH)_3$ in the mixture 14 is preferably an amount that can improve the alkali resistance and dendrite resistance without impairing hydroxide-ion conductivity of the LDH separator 10 and is not limited to any particular amount. $In(OH)_3$ may have a cubic crystal structure and may be in a configuration where the crystals thereof are surrounded by the LDH-like compounds. The $In(OH)_3$ can be identified by X-ray diffraction; and X-ray diffraction measurement is preferably conducted according to the procedure described in Evaluation 4 in the Example below.

The LDH separator 10 preferably has an ionic conductivity of 0.1 mS/cm or more, more preferably 1.0 mS/cm or more, still more preferably 1.5 mS/cm or more, and particularly preferably 2.0 mS/cm or more. Within such a range, the LDH separator can exhibit a sufficient function as an LDH separator. The higher the ionic conductivity is, the better it becomes, and therefore, the upper limit is not particularly limited, but is, for example, 10 mS/cm. The ionic conductivity is calculated based on a resistance of the LDH separator and a thickness and an area of the LDH separator. The resistance of the LDH separator 10 can be determined from obtaining an intercept of a real axis as the resistance of the LDH separator by subjecting the LDH separator 10 immersed in a KOH aqueous solution having a predetermined concentration (for example, 5.4 M) to measurement using an electrochemical measurement system (potentio/galvanostat-frequency response analyzer) at a frequency range of 1 MHz to 0.1 Hz and an applied voltage of 10 mV.

The LDH separator 10 is a separator comprising the mixture 14 of the layered double hydroxide (LDH)-like compound and $In(OH)_3$, and isolates a positive electrode plate and a negative electrode plate so as to be hydroxide-ion conductive when incorporated in a zinc secondary battery. The preferred LDH separator 10 has a gas impermeability and/or a water impermeability. In other words, the LDH separator 10 is preferably densified to such an extent that it has a gas impermeability and/or a water impermeability.

Incidentally, as described in Patent Literatures 2 and 3 and used herein, "having a gas impermeability" means that even if helium gas is brought into contact with one side of an object to be measured in water at a differential pressure of 0.5 atm, generation of bubbles due to helium gas is not observed from another side. Moreover, as described in Patent Literatures 2 and 3 and used herein, "having a water impermeability" refers to allowing no permeation of water in contact with one side of an object to be measured to another side. Namely, the LDH separator 10 having a gas impermeability and/or a water impermeability refers to the LDH separator 10 having a high denseness to the degree that it does not allow a gas or water to pass through, and refers not to a porous film or other porous material that has a water permeability or a gas permeability. In such a manner, the LDH separator 10 selectively allows only hydroxide ions to pass through due to its hydroxide-ion conductivity, and can exhibit a function as a battery separator. Therefore, the composition thereof is extremely effective in physically blocking penetration of the separator by the zinc dendrites generated upon charge to prevent a short circuit between the positive and negative electrodes. Since the LDH separator 10 has a hydroxide-ion conductivity, it enables efficient movement of necessary hydroxide ions between the positive electrode plate and the negative electrode plate, and can realize a charge/discharge reaction in the positive electrode plate and the negative electrode plate.

The LDH separator 10 preferably has a He permeability of 10 cm/min·atm or less per unit area, more preferably 5.0 cm/min·atm or less, and further preferably 1.0 cm/min·atm or less. It can be said that the LDH separator 10 having the He permeability within such a range has an extremely high denseness. Therefore, a separator having a He permeability of 10 cm/min·atm or less can block passage of substances other than hydroxide ions at a high level. For example, in the case of a zinc secondary battery, permeation of Zn (typically permeation of zinc ions or zincate ions) in an electrolytic solution can be inhibited extremely effectively. The He permeability is measured via a step of supplying He gas to one surface of a separator to allow it to permeate the He gas, and a step of calculating a He permeability and evaluating a denseness of the LDH separator. The He permeability is calculated by the formula of F/(P×S) using a permeation amount F of He gas per unit time, a differential pressure P applied to a separator when the He gas permeates, and a membrane area S through which the He gas permeates. By evaluating the gas permeability using the He gas in such a manner, it is possible to evaluate denseness (dense or sparse) at an extremely high level, and as a result, it is possible to effectively evaluate a high denseness such that substances other than hydroxide ions (particularly Zn bringing about zinc dendrite growth) are not allowed to be permeated as much as possible (only a trace amount is permeated). This is because He gas has the smallest constituent unit among a wide variety of atomic and molecular species that can compose a gas, and has extremely low reactivity. Namely, a single He atom composes He gas without forming a molecule. In this respect, since a hydrogen gas is composed of $H_2$ molecules, the single He atom is smaller as a gas constituent unit. In the first place, $H_2$ gas is dangerous because it is a flammable gas. Then, by adopting an index of the He gas permeability defined by the above formula, it is possible to easily conduct objective evaluation relating to the denseness regardless of differences in various sample sizes and measurement conditions. Thus, it is possible to easily, safely, and effectively evaluate whether or not the separator has a sufficiently high denseness suitable for a separator for zinc secondary batteries. The measurement of a He permeability can be preferably carried out according to the procedure shown in Evaluation 5 of Examples, as will be described below.

Even when the LDH separator 10 is immersed in an aqueous solution of 5.4 M (mol/L) KOH containing zinc oxide at a concentration of 0.4 M (mol/L) at 90° C. for one week (i.e., 168 hours), the He permeability per unit area is preferably 10 cm/min·atm or less, more preferably 5.0 cm/min·atm or less, and still more preferably 1.0 cm/min·atm or less. The separator within the above range can be regarded as having almost no change in He permeability before and after the immersion in alkali, whereby it can be said to have extremely excellent alkali resistance. In this respect, in the present invention, containing at least Mg, Ti and Y in the LDH-like compound and the presence of $In(OH)_3$ are presumed to effectively enable an increase in He permeability after alkaline immersion to be inhibited. Incidentally, the immersion in the potassium hydroxide aqueous solution at an elevated temperature of 90° C. can be said a severer alkali-resistance acceleration test than that at a lowered temperature (for example, 30° C.).

As described above, the LDH separator 10 comprises the mixture 14 and porous substrate 12 (typically composed of the porous substrate 12 and mixture 14), and the LDH-like compound fills up pores of the porous substrate so that the LDH separator 10 exhibits a hydroxide-ion conductivity and a gas impermeability (and therefore to function as a separator exhibiting a hydroxide-ion conductivity). The mixture 14 is particularly preferably incorporated over the entire region of the porous substrate 12 in the thickness direction thereof. The thickness of the LDH separator 10 is preferably 3 to 80 µm, more preferably 3 to 60 µm, and even more preferably 3 to 40 µm.

The porous substrate 12 is preferably composed of at least one selected from the group consisting of ceramic materials, metallic materials, and polymer materials, and is more preferably composed of at least one selected from the group consisting of ceramic materials and polymer materials. In this case, the ceramic material preferably includes, for example, alumina, zirconia, titania, magnesia, spinel, calcia, cordierite, zeolite, mullite, ferrite, zinc oxide, silicon carbide, and any combination thereof, and it more preferably includes alumina, zirconia, titania, and any combination thereof, and particularly preferably alumina, zirconia (for example, yttria-stabilized zirconia (YSZ)), and combinations thereof. When these porous ceramics are used, formation of an LDH separator having an excellent denseness is facilitated. The metallic materials preferably include, for example, aluminum, zinc, and nickel.

The porous substrate 12 is particularly preferably composed of a polymer material. The polymer porous substrate has advantages of 1) flexibility (hence, it is hard to break even if being thin.), 2) facilitation of increase in porosity, 3) facilitation of increase in a conductivity (because it can be rendered thin while increasing porosity.), and 4) facilitation of manufacture and handling. Moreover, by taking advantage of the flexibility of 1) above, it also has 5) an advantage of capable of easily bending or jointing by sealing, an LDH separator comprising a porous substrate made of a polymer material. Examples of preferred polymer materials include polystyrene, polyethersulfone, polypropylene, an epoxy resin, polyphenylene sulfide, fluororesins (polytetrafluoroethylene: PTFE, etc.), cellulose, nylon, polyethylene, acrylonitrile styrene, polysulfone, an acrylonitrile-butadiene-styrene (ABS) resin, polyvinyl chloride, an acetal resin, a polyvinyl alcohol (PVA) resin, polyvinylidene chloride, polyvinylidene fluoride, a phenolic resin, an allyl resin, a furan resin, and arbitrary combinations thereof. All of the various preferred materials described above have alkali resistance as resistance to an electrolytic solution of a battery. The polymer materials are particularly preferably polyolefins such as polypropylene and polyethylene, and most preferably polypropylene or polyethylene, in terms of excellent hydrothermal resistance, acid resistance, and alkali resistance as well as low cost. When the porous substrate 12 is composed of a polymer material, the mixture 14 is particularly preferably incorporated over the entire region of the porous substrate 12 in the thickness direction thereof (for example, most or almost all the pores inside the porous substrate 12 are filled with the mixture 14). As such a polymer porous substrate, a commercially available polymer microporous membrane can preferably be used.

Production Method

The method for producing the LDH separator 10 is not particularly limited, and it can be fabricated by appropriately modifying the conditions (in particular the LDH raw material composition) of the production methods for LDH-containing functional layers and composite materials that are already known (see, for example, Patent Literatures 1 to 5). For example, according to the following procedures (1) to (4), a functional layer including the LDH-like compound containing Mg, Ti, and Y (or further Al and/or In) and In(OH)$_3$, and a composite material (i.e., LDH separator), can be produced.

(1) A porous substrate is prepared.

(2) The porous substrate is coated with a solution containing a titania sol and an yttrium sol (or further an alumina sol) and the coating substrate is dried to form a titania and yttrium-containing layer.

(3) The porous substrate is immersed in a raw material aqueous solution containing magnesium ions (Mg$^{2+}$), indium ions (In$^{3+}$) and urea.

(4) The porous substrate is subjected to hydrothermal treatment in the aqueous raw material solution to obtain an LDH separator in which the functional layer including an LDH-like compound and In(OH)$_3$ is formed on the porous substrate and/or in the porous substrate.

In particular when fabricating a composite material (i.e., LDH separator) in which the porous substrate 12 is composed of a polymeric material and the mixture 14 is incorporated over the entire region of the porous substrate in the thickness direction thereof, a substrate is preferably coated with the mixed sol solution in (2) above in such a way that the mixed sol solution penetrates the entire or most of the inside of the substrate. Such a way enables most or almost all of the pores inside the porous substrate to be filled with the LDH-like compound. Examples of preferred coating techniques include dip coating, filtration coating and the like, and the dip coating is particularly preferred. Adjustment of the number of coating of dip coating or the like can adjust an amount of the mixed sol solution adhered. After drying the substrate coated with the mixed sol solution by dip coating or the like, the steps (3) and (4) above may be carried out. It is presumed that the presence of urea in the above step (3) raises a pH value by generation of ammonia in the solution utilizing hydrolysis of urea, and the coexisting metal ions form a hydroxide and/or an oxide to enable the LDH-like compound and In(OH)$_3$ to be obtained.

When the porous substrate 12 is composed of a polymer material, it is preferred to subject the LDH separator obtained by the above method, etc., to pressing treatment, whereby an LDH separator excellent in a higher denseness can be obtained. The pressing method may be, for example, roll pressing, uniaxial pressing, or CIP (cold isostatic pressing), and it is not particularly limited, but is preferably roll pressing. This pressing is preferred in that it sufficiently fills up pores of the porous substrate with an LDH-like compound by softening the polymer porous substrate during heating. For sufficient softening, for example, in the case of polypropylene or polyethylene, it is preferred to heat the polymer at 60 to 200° C. Pressing such as roll pressing in such a temperature range can significantly reduce the residual pores of the LDH separator. As a result, the LDH separator can be extremely highly densified and therefore short circuits caused by zinc dendrites can be inhibited even more effectively. In roll pressing, morphology of residual pores can be controlled by appropriately adjusting a roll gap and a roll temperature, whereby an LDH separator having a desired denseness can be obtained.

Zinc Secondary Battery

The LDH separator of the present invention is preferably applied to a zinc secondary battery. Therefore, according to a preferred aspect of the present invention, a zinc secondary battery comprising an LDH separator is provided. A typical zinc secondary battery comprises a positive electrode, a negative electrode, and an electrolytic solution, and the positive electrode and the negative electrode are separated from each other with an LDH separator interposed therebetween. The zinc secondary battery of the present invention is not particularly limited provided that it is a secondary battery in which zinc is used as a negative electrode and an electrolytic solution (typically an alkali metal hydroxide aqueous solution) is used. Therefore, it can be a nickel-zinc secondary battery, a silver oxide-zinc secondary battery, a manganese oxide-zinc secondary battery, a zinc-air secondary battery, or various other alkaline-zinc secondary batteries. For example, a positive electrode preferably comprises nickel hydroxide and/or nickel oxyhydroxide whereby the zinc secondary battery forms a nickel-zinc secondary battery. Alternatively, the positive electrode may be an air electrode whereby the zinc secondary battery forms a zinc-air secondary battery.

Solid Alkaline Fuel Cell

The LDH separator of the present invention can also be applied to a solid alkaline fuel cell. Namely, by using the LDH separator in which pores of the porous substrate are filled up with the LDH-like compound and highly densified, the solid alkaline fuel cell can be provided, which is capable of effectively inhibiting reduction of an electromotive force due to permeation of a fuel to an air electrode side (for example, crossover of methanol).

This is because the permeation of the fuel such as methanol to the LDH separator can be effectively inhibited while exhibiting the hydroxide-ion conductivity of the LDH separator. Therefore, according to another preferred aspect of the present invention, a solid alkaline fuel cell comprising the LDH separator is provided. A typical solid alkaline fuel cell according to the aspect includes an air electrode to which oxygen is supplied, a fuel electrode to which a liquid fuel and/or a gaseous fuel are supplied, and an LDH separator interposed between the fuel electrode and the air electrode.

Other Batteries

The LDH separator of the present invention can be used not only for nickel-zinc batteries and solid alkaline fuel cells, but also for nickel-hydrogen batteries, for example. In this case, the LDH separator functions to block the nitride shuttle (movement of nitric acid groups between electrodes), which is a factor of self-discharge of the battery. Moreover, the LDH separator of the present invention can also be used for a lithium battery (a battery having a negative electrode made of lithium metal), a lithium ion battery (a battery having a negative electrode made of carbon, etc.), or a lithium-air battery, etc.

EXAMPLES

The present invention will be described in more detail with reference to the following examples. The evaluation methods of the LDH separators fabricated in the following examples will be described as follows.

Evaluation 1: Observation of Surface Microstructure

A surface microstructure of an LDH separator was observed by using a scanning electron microscope (SEM, JSM-6610LV, manufactured by JEOL Ltd.) at an accelerating voltage of 10 to 20 kV.

Evaluation 2: STEM Analysis of Layered Structure

A layered structure of the LDH separator was analyzed by a scanning transmission electron microscope (STEM) (product name: JEM-ARM200F, manufactured by JEOL Ltd.) at an acceleration voltage of 200 kV.

Evaluation 3: Elemental Analysis Evaluation (EDS)

Composition analysis was conducted on an LDH separator surface using an EDS analyzer (apparatus name: X-act, Oxford Instruments plc) to calculate a composition ratio (atomic ratio) of Mg:Al:Ti:Y:In. This analysis was carried out by 1) capturing an image at an accelerating voltage of 20 kV and a magnification of 5,000 times, 2) carrying out a three-point analysis at about 5 μm intervals in a point analysis mode, 3) repeating the above 1) and 2) once more, and 4) calculating an average value of a total of 6 points.

Evaluation 4: X-ray Diffraction Measurement

An XRD profile was obtained by measuring a crystal phase of an LDH separator with an X-ray diffractometer (RINT TTR III manufactured by Rigaku Corporation) under the measurement conditions of voltage: 50 kV, current value: 300 mA, and measurement range: 5 to 40°.

Evaluation 5: He Permeation Measurement

From the viewpoint of a He permeability, a He permeation test was carried out as follows in order to evaluate a denseness of an LDH separator. First, the He permeability measurement system 310 shown in FIG. 2A and FIG. 2B was build up. The He permeability measurement system 310 was constituted so that He gas from a gas cylinder filled with the He gas was supplied to a sample holder 316 via a pressure gauge 312 and a flow meter 314 (digital flow meter), and it was permeated from one surface of an LDH separator 318 held in the sample holder 316 to the other surface and discharged.

The sample holder 316 has a structure including a gas supply port 316a, a closed space 316b, and a gas discharge port 316c, and was assembled as follows. First, an adhesive 322 was applied along an outer circumference of the LDH separator 318 and attached to a jig 324 (made of an ABS resin) having an opening in the center. A packing made of butyl rubber was arranged as sealing members 326a and 326b at the upper end and lower end of the jig 324, and was further sandwiched by support members 328a and 328b (made of PTFE) having openings that were made from flanges, from the outside of the sealing members 326a and 326b. In this manner, the closed space 316b was partitioned by the LDH separator 318, the jig 324, the sealing member 326a, and the support member 328a. The support members 328a and 328b were firmly tightened to each other by a fastening means 330 using screws so that He gas did not leak from portions other than a gas discharge port 316c. A gas supply pipe 334 was connected to the gas supply port 316a of the sample holder 316 thus assembled via a joint 332.

Next, He gas was supplied to the He permeability measurement system 310 via the gas supply pipe 334, and was permeated through the LDH separator 318 held in the sample holder 316. At this time, a gas supply pressure and a flow rate were monitored by the pressure gauge 312 and the flow meter 314. After permeating the He gas for 1 to 30 minutes, a He permeability was calculated. The He permeability was calculated by the formula of $F/(P \times S)$ using a permeation amount F ($cm^3$/min) of the He gas per unit time, a differential pressure P (atm) applied to the LDH separator when the He gas permeates, and a membrane area S ($cm^2$) through which the He gas permeates. The permeation amount F ($cm^3$/min) of the He gas was read directly from the flow meter 314. Moreover, as the differential pressure P, a gauge pressure read from the pressure gauge 312 was used. The He gas was supplied so that the differential pressure P was in the range of 0.05 to 0.90 atm.

Evaluation 6: Measurement of Ionic Conductivity

A conductivity of an LDH separator in an electrolytic solution was measured as follows by using the electrochemical measurement system shown in FIG. 3. The LDH separator sample S was sandwiched with 1 mm thick silicone packings 440 from both sides of the sample and incorporated into a PTFE flange type cell 442 having an inner diameter of 6 mm. As an electrode 446, a nickel wire mesh of #100 mesh was incorporated into the cell 442 in a cylindrical fashion having a diameter of 6 mm, so that a distance between the electrodes was 2.2 mm. As an electrolytic solution 444, a 5.4 M KOH aqueous solution was filled in the cell 442. By using an electrochemical measurement system (potentio/galvanostat-frequency response analyzer manufactured by Solartron Analytical, type: 1287A and 1255B), measurement was carried out under the conditions of a frequency range of 1 MHz to 0.1 Hz and an applied voltage of 10 mV, and an intercept of a real number axis was used as a resistance of the LDH separator sample S. The same measurement as above was carried out without the LDH separator sample S, and a blank resistance was also determined. The difference between the resistance of the LDH separator sample S and the blank resistance was defined as a resistance of the LDH separator. The conductivity was determined by using the resistance of the obtained LDH separator and a thickness and an area of the LDH separator.

Evaluation 7: Alkali Resistance Evaluation

An aqueous solution of 5.4 M KOH containing zinc oxide at a concentration of 0.4 M, was prepared. 0.5 mL of the prepared KOH aqueous solution and an LDH separator sample in 2 cm square size were fed in a Teflon® airtight container. Then, after having held it at 90° C. for 1 week (i.e., 168 hours), the LDH separator sample was removed from the airtight container. The removed LDH separator sample was rinsed with 15 mL of ion-exchanged water and then dried overnight at room temperature. The He permeability of the sample obtained was calculated in the same method as in Evaluation 5, and presence or absence of a change in He permeability before and after immersion in alkali was determined.

Evaluation 8: Evaluation of Dendrite Resistance (Cycle Test)

A cycle test was carried out as follows to evaluate an effect of inhibiting a short circuit (dendrite resistance) caused by zinc dendrites of an LDH separator. First, each of a positive electrode (containing nickel hydroxide and/or nickel oxyhydroxide) and a negative electrode (containing zinc and/or zinc oxide) was wrapped with a nonwoven fabric, and was welded with a current extraction terminal. The positive electrode and the negative electrode thus prepared were opposed to each other via an LDH separator, sandwiched between laminated films provided with a current extraction port, and heat-sealed on three sides of the laminated film. An electrolytic solution (a solution in which 0.4 M zinc oxide was dissolved in a 5.4 M KOH aqueous solution) was added to the cell container thus obtained with an upper portion being opened, and the electrolytic solution was sufficiently permeated through the positive electrode and the negative electrode by vacuum evacuation, etc. Thereafter, the remaining one side of the laminated film was also heat-sealed to form a simple sealed cell. Chemical conversion was carried out on the simple sealed cell with 0.1 C charge and 0.2 C discharge by using a charge/discharge apparatus (TOSCAT3100 manufactured by Toyo System Co., Ltd.). Then, a 1 C charge/discharge cycle was carried out. While the charge/discharge cycle was repeated under the same conditions, a voltage between the positive electrode and the negative electrode was monitored with a voltmeter, and presence or absence of a sudden voltage drop accompanying a short circuit due to zinc dendrites between the positive electrode and the negative electrode (specifically, a voltage drop of 5 mV or more with respect to the voltage plotted immediately before), was examined and evaluated according to the following criteria:

No short circuit: The above sudden voltage drop was not observed upon charge even after 300 cycles.

Short circuiting: The above sudden voltage drop was observed upon charge in less than 300 cycles.

Example 1

(1) Preparation of Polymer Porous Substrate

A commercially available polyethylene microporous membrane having a porosity of 50%, an average pore diameter of 0.1 μm, and a thickness of 20 μm was prepared as a polymer porous substrate and cut out to a size of 2.0 cm×2.0 cm.

(2) Coating of titania·yttria·alumina Sol on Polymer Porous Substrate

A titanium dioxide sol solution (M6, manufactured by Taki Chemical Co., Ltd.), an yttrium sol, and an amorphous alumina solution (Al-ML15, manufactured by Taki Chemical Co. Ltd.) were mixed so that Ti/(Y+Al) (molar ratio)=2, and Y/Al (molar ratio)=8. The substrate prepared in (1) above was coated with the mixed solution by dip coating. The dip coating was carried out by dipping the substrate into 100 ml of the mixed solution, pulling up the coating substrate vertically, and allowing it to dry for 3 hours at room temperature.

(3) Preparation of Raw Material Aqueous Solution

As the raw materials, magnesium nitrate hexahydrate $(Mg(NO_3)_2 \cdot 6H_2O$, manufactured by Kanto Chemical Co., Inc.), indium sulfate n-hydrate $(In(SO_4)_3 \cdot nH_2O$, manufactured by FUJIFILM Wako Pure Chemicals Corporation), and urea $((NH_2)_2CO$, manufactured by Sigma-Aldrich Co. LLC) were prepared. Magnesium nitrate hexahydrate, indium sulfate n-hydrate, and the urea were weighed so as to adjust the concentrations thereof to 0.0075 mol/L, 0.0075 mol/L, and 1.44 mol/L, respectively and placed in a beaker, to which ion-exchanged water was added to make a total volume 75 ml. The resulting solution was stirred to obtain a raw material aqueous solution.

(4) Membrane Formation by Hydrothermal Treatment

Both the raw material aqueous solution and the dip-coated substrate were sealed in a Teflon® airtight container (autoclave container having a content of 100 ml and an outer side jacket made of stainless steel). At this time, a substrate was fixed while being floated from the bottom of the Teflon® airtight container, and installed vertically so that the solution was in contact with both sides of the substrate. Thereafter, an LDH-like compound was formed on the surface and the inside of the substrate by subjecting it to hydrothermal treatment at a hydrothermal temperature of 120° C. for 22 hours. With an elapse of the predetermined time, the substrate was taken out from the airtight container, washed with ion-exchanged water, and dried at 70° C. for 10 hours to allow for forming of a functional layer including an LDH-like compound and $In(OH)_3$ inside pores of the porous substrates. Thus, an LDH separator was obtained.

(5) Densification by Roll Pressing

The LDH separator was sandwiched between a pair of PET films (Lumiler® manufactured by Toray Industries, Inc., thickness of 40 μm), and roll-pressed at a roll rotation speed of 3 mm/s, a roller heating temperature of 70° C., and a roll gap of 70 μm to obtain a further densified LDH separator.

(6) Evaluation Result

Evaluations 1 to 8 were conducted for the hydroxide ion conduction separators obtained. The results were as follows.

Figure 4:
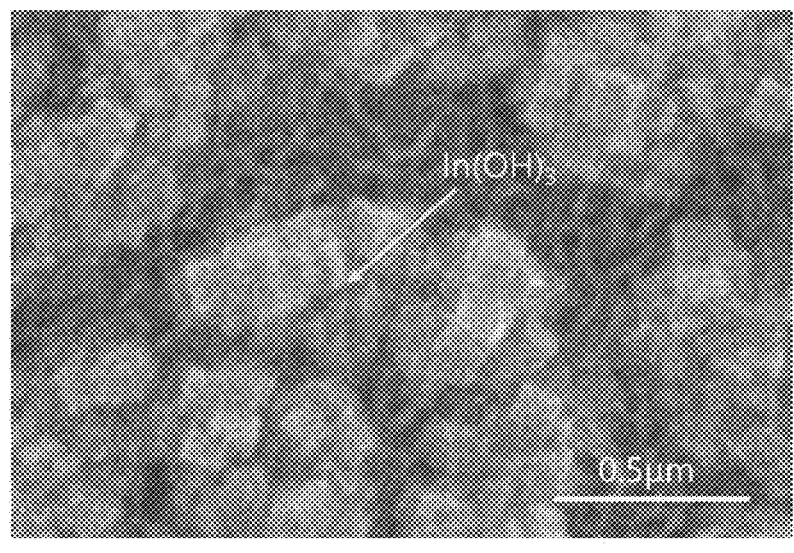
FIG. 4 is a surface SEM image of the LDH separator fabricated in Example 1.

Evaluation 1: The SEM image of surface microstructure of the LDH separator obtained in Example 1 (before having been roll pressed) was shown in FIG. 4. As shown in FIG. 4, cubic crystals were confirmed to be observed on the surface of the LDH separator. The results of EDS elemental analysis and X-ray diffraction measurement described below demonstrate that these cubic crystals are presumed to be $In(OH)_3$.

Evaluation 2: From the observation result of layered lattice stripes, the LDH separator was confirmed to include a compound with a layered crystal structure.

Evaluation 3: As a result of EDS elemental analysis, the constituent elements of the LDH-like compound or $In(OH)_3$, which were Mg, Al, Ti, Y, and In were detected on the surface of the LDH separator. Moreover, in the cubic crystals present on the surface of the LDH separator, In that was a constituent element of $In(OH)_3$, was detected. The composition ratio (atomic ratio) of Mg, Al, Ti, Y, and In on the surface of the LDH separator, calculated by EDS elemental analysis is as shown in Table 1.

Evaluation 4: The peaks in the XRD profile obtained identified that $In(OH)_3$ was present in the LDH separator. This identification was conducted using the diffraction peaks of $In(OH)_3$ listed in JCPDS card No. 01-085-1338.

Evaluation 5: As shown in Table 1, the extremely high denseness was confirmed by a He permeability of 0.0 cm/min·atm.

Evaluation 6: As shown in Table 1, the high ionic conductivity was confirmed.

Evaluation 7: The He permeability after alkaline immersion was 0.0 cm/min·atm, as in Evaluation 5, and the He permeability remained unchanged even over one week of alkaline immersion at the elevated temperature of 90° C., confirming the excellent alkali resistance.

Evaluation 8: As shown in Table 1, the excellent dendrite resistance was confirmed in that there was no short circuit due to zinc dendrites even after 300 cycles.

Example 2

An LDH separator was fabricated and evaluated in the same manner as in Example 1 except that the titania-yttria sol coating was carried out as follows instead of (2) above.

(Coating of Titania-Yttria Sol on Polymer Porous Substrate)

A titanium dioxide sol solution (M6, manufactured by Taki Chemical Co., Ltd.) and an yttrium sol were mixed so that Ti/Y (molar ratio)=2. The substrate prepared in (1) above was coated with the obtained mixed solution by dip coating. The dip coating was carried out by dipping the substrate into 100 ml of the mixed solution, pulling up the coating substrate vertically, and allowing it to dry for 3 hours at room temperature.

Figure 5:
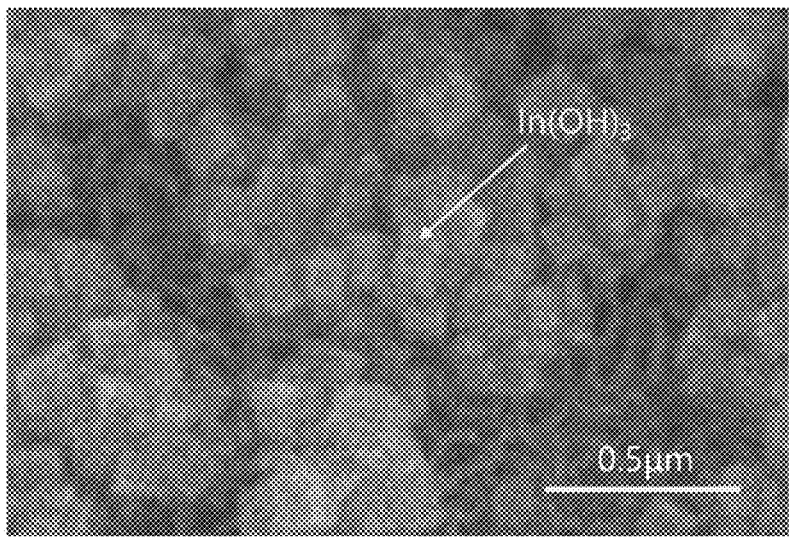
FIG. 5 is a surface SEM image of the LDH separator fabricated in Example 2.

Evaluation 1: The SEM image of surface microstructure of the LDH separator obtained in Example 2 (before being roll pressed) is as shown in FIG. 5. As shown in FIG. 5, cubic crystals were confirmed to be observed on the surface of the LDH separator. The results of EDS elemental analysis and X-ray diffraction measurement described below demonstrate that these cubic crystals are presumed to be $In(OH)_3$.

Evaluation 2: From the observation result of layered lattice stripes, the LDH separator was confirmed to include a compound having a layered crystal structure.

Evaluation 3: As a result of EDS elemental analysis, the constituent elements of the LDH-like compound or $In(OH)_3$, which were Mg, Ti, Y, and In were detected on the surface of the LDH separator. Moreover, in the cubic crystals on the surface of the LDH separator, In that is a constituent element of $In(OH)_3$, was detected. The composition ratio (atomic ratio) of Mg, Ti, Y, and In on the surface of the LDH separator, calculated by EDS elemental analysis is as shown in Table 1.

Evaluation 4: The peaks in the XRD profile obtained identified that $In(OH)_3$ was present in the LDH separator. This identification was conducted using the diffraction peaks of $In(OH)_3$ listed in JCPDS card No. 01-085-1338.

Evaluation 5: As shown in Table 1, the extremely high denseness was confirmed by a He permeability of 0.0 cm/min·atm.

Evaluation 6: The high ionic conductivity was confirmed, as shown in Table 1.

Evaluation 7: The He permeability after alkaline immersion was 0.0 cm/min·atm, as in Evaluation 5, and the He permeability remained unchanged even over one week of alkaline immersion at the elevated temperature of 90° C., confirming the excellent alkali resistance.

Evaluation 8: As shown in Table 1, no short circuit caused by zinc dendrite occurred even after 300 cycles, confirming the excellent dendrite resistance.

Example 3 (Comparative)

An LDH separator was fabricated and evaluated in the same manner as in Example 1 except that alumina sol coating was carried out as follows instead of (2) above and preparation of raw material aqueous solution was carried out instead of (3) above.
(Coating of Alumina Sol on Polymer Porous Substrate)

so that it would be 0.015 mol/L and placed in a beaker, and ion-exchanged water was added therein to make a total amount of 75 ml. After stirring the solution obtained, urea weighed at a ratio of urea/$NO_3^-$ (molar ratio)=48 was added to the solution and further stirred to obtain a raw material aqueous solution.

Figure 6:
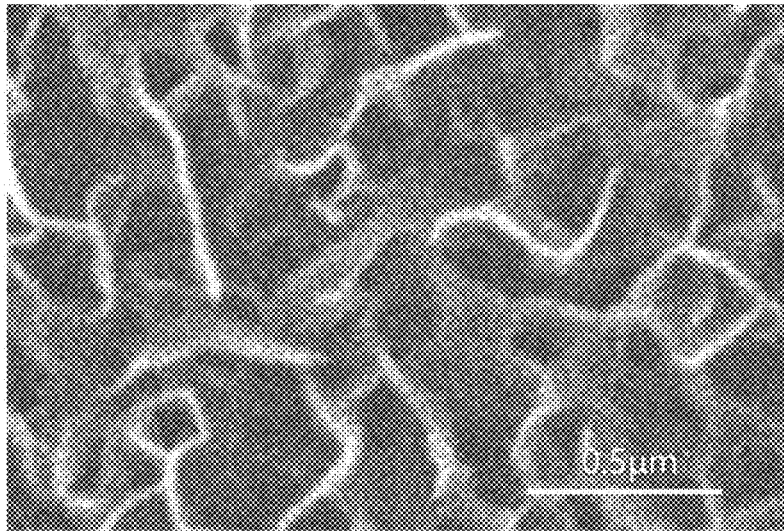
FIG. 6 is a surface SEM image of the LDH separator fabricated in Example 3 (comparison).

Evaluation 1: The SEM image of surface microstructure of the LDH separator obtained in Example 3 (before having been roll pressed) is shown in FIG. 6.

Evaluation 2: From the observation result of layered lattice stripes, the portion other than the porous substrate of the LDH separator was confirmed to be a compound having a layered crystal structure.

Evaluation 3: As a result of EDS elemental analysis, the LDH constituent elements that were Mg and Al were detected on the surface of the LDH separator. Moreover, the composition ratio (atomic ratio) of Mg and Al on the surface of the LDH separator, calculated by EDS elemental analysis was as shown in Table 1.

Evaluation 4: The peak in the vicinity of $2\theta=11.5°$ in the XRD profile obtained identified that the LDH separator obtained in Example 3 was an LDH separator (hydrotalcites compound). This identification was conducted using the diffraction peaks of LDH (hydrotalcites compound) listed in JCPDS card No. 35-0964.

Evaluation 5: As shown in Table 1, the extremely high denseness was confirmed by a He permeability of 0.0 cm/min-atm.

Evaluation 6: The high ionic conductivity was confirmed, as shown in Table 1.

Evaluation 7: As a result of alkaline immersion over one week even at an elevated temperature of 90° C., the He permeability that had been 0.0 cm/min·atm in Evaluation 5 exceeded 10 cm/min·atm, indicating the inferior alkali resistance.

Evaluation 8: As shown in Table 1, the short circuit caused by the zinc dendrite occurred after less than 300 cycles, indicating the inferior dendrite resistance.

TABLE 1

| | Constitution of functional layer | Composition ratio (atomic ratio relative to 100 of total amount of Mg + Al + Ti + Y + In) | In/(Mg + Al + Ti + Y + In) | Evaluation of LDH separator | | | |
|---|---|---|---|---|---|---|---|
| | | | | He permeability (cm/min · atm) | Ion conductivity (mS/cm) | Alkali resistance Presence or absence of change in He permeability | Dendrite resistance Presence or absence of short circuit |
| Example 1 | LDH-like + $In(OH)_3$ | Mg:7, Al:1, Ti:24, Y:3, In:65 | 0.65 | 0.0 | 2.7 | Absent | Absent |
| Example 2 | LDH-like + $In(OH)_3$ | Mg:6, Al:0, Ti:17, Y:3, In:74 | 0.74 | 0.0 | 2.8 | Absent | Absent |
| Example 3* | LDH | Mg:68, Al:32 | 0 | 0.0 | 2.7 | Present | Present |

*indicates Comparative Example.

The substrate prepared in (1) above was coated with an amorphous alumina sol solution (Al-ML15, manufactured by Taki Chemical Co., Ltd.) by dip coating. The dip coating was carried out by dipping the substrate into 100 ml of the mixed solution, pulling up the coating substrate vertically, and allowing it to dry for 3 hours at room temperature.
(Preparation of Raw Material Aqueous Solution)

Magnesium nitrate hexahydrate ($Mg(NO_3)_2·6H_2O$, manufactured by Kanto Chemical Co., Inc.) and urea (($NH_2)_2CO$, manufactured by Sigma-Aldrich Co. LLC) were prepared as raw materials. Magnesium nitrate hexahydrate was weighed

What is claimed is:

1. An LDH separator comprising a porous substrate and a solid mixture of a layered double hydroxide (LDH)-like compound and $In(OH)_3$, which fills up pores of the porous substrate,
   wherein the LDH-like compound is a hydroxide and/or an oxide with a layered crystal structure, comprising Mg, Ti, Y, and optionally Al and/or In.

2. The LDH separator according to claim 1, wherein the porous substrate is made of a polymeric material.

3. The LDH separator according to claim 2, wherein the polymer material is selected from the group consisting of polystyrene, polyethersulfone, polypropylene, an epoxy resin, polyphenylene sulfide, a fluororesin, cellulose, nylon, polyethylene, acrylonitrile styrene, polysulfone, an acrylonitrile-butadiene-styrene (ABS) resin, polyvinyl chloride, an acetal resin, a polyvinyl alcohol (PVA) resin, polyvinylidene chloride, polyvinylidene fluoride, a phenolic resin, an allyl resin, and a furan resin.

4. The LDH separator according to claim 1, wherein the LDH separator has an ion conductivity of 2.0 mS/cm or more.

5. The LDH separator according to claim 1, wherein the LDH separator has a He permeability per unit area of 10 cm/min·atm or less.

6. The LDH separator according to claim 5, wherein the LDH separator has a He permeability per unit area of 10 cm/min atm or less even when being immersed in an aqueous solution of 5.4 M KOH containing zinc oxide at a concentration of 0.4 M at 90° C. for one week.

7. A zinc secondary battery comprising the LDH separator according to claim 1.

8. A solid alkaline fuel cell comprising the LDH separator according to claim 1.

* * * * *